(12) United States Patent
Hintz

(10) Patent No.: US 12,151,729 B1
(45) Date of Patent: Nov. 26, 2024

(54) FUEL CELL ASSEMBLY FOR EASY REMOVAL AND INSTALLATION OF FUEL CELL SYSTEM

(71) Applicant: BLOOM ENERGY CORPORATION, San Jose, CA (US)

(72) Inventor: Robert Hintz, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/406,888

(22) Filed: Jan. 8, 2024

(51) Int. Cl.
| | |
|---|---|
| *H01M 8/249* | (2016.01) |
| *B62B 3/04* | (2006.01) |
| *B62B 3/06* | (2006.01) |
| *B62B 3/10* | (2006.01) |
| *H01M 8/04* | (2016.01) |

(52) U.S. Cl.
CPC ............. *B62B 3/04* (2013.01); *B62B 3/10* (2013.01); *B62B 2202/61* (2013.01); *H01M 8/04* (2013.01); *H01M 2250/20* (2013.01)

(58) Field of Classification Search
CPC ..... H01M 8/249; H01M 2250/20; B62B 3/04; B62B 3/06; B62B 3/0618; B62B 3/10
USPC .......................... 193/35 R, 35 SS; 198/621.2
See application file for complete search history.

(56) References Cited

U.S. PATENT DOCUMENTS

| | | | | |
|---|---|---|---|---|
| 3,019,930 | A * | 2/1962 | Allen ................. | B62B 3/0618 |
| | | | | 414/667 |
| 4,205,740 | A * | 6/1980 | Hammond .......... | B65G 13/12 |
| | | | | 104/135 |
| 4,823,927 | A * | 4/1989 | Jensen ................ | B65G 13/12 |
| | | | | 193/35 SS |
| 5,947,676 | A * | 9/1999 | Richard ............ | B29C 45/1756 |
| | | | | 414/535 |
| 6,382,385 | B2 * | 5/2002 | Ransil ................. | B65G 13/12 |
| | | | | 198/782 |
| 6,422,372 | B2 * | 7/2002 | Ransil ................ | B65D 88/546 |
| | | | | 198/782 |
| 6,585,473 | B2 * | 7/2003 | Turner ................ | B65G 13/12 |
| | | | | 414/535 |
| 9,688,478 | B2 * | 6/2017 | Robbin ............... | B65G 35/06 |
| 10,840,535 | B2 | 11/2020 | Richards et al. | |
| 11,862,832 | B2 * | 1/2024 | Raghavan .......... | H01M 8/2484 |
| 2012/0141241 | A1 * | 6/2012 | Kordel et al. | |

\* cited by examiner

*Primary Examiner* — Douglas A Hess
(74) *Attorney, Agent, or Firm* — Evergreen Valley Law Group; Kanika Radhakrishnan

(57) ABSTRACT

A fuel cell assembly for easy removal and installation of a fuel cell system is described. The fuel cell assembly includes one or more first rolling members provided in one or more first slots of a first base arrangement, where a plurality of holes are configured on a second surface of the first base arrangement. Each of the one or more first rolling members includes a plurality of rollers configured to be inflated and deflated. The inflating and deflating of each first rolling member facilitate movement of the plurality of rollers of each first rolling member into a plurality of holes and out of the plurality of holes, respectively, which enables the fuel cell system to move between a raised position and a lowered position. The raised position of the fuel cell system indicates a position in which the fuel cell system is in contact with the plurality of rollers.

10 Claims, 17 Drawing Sheets

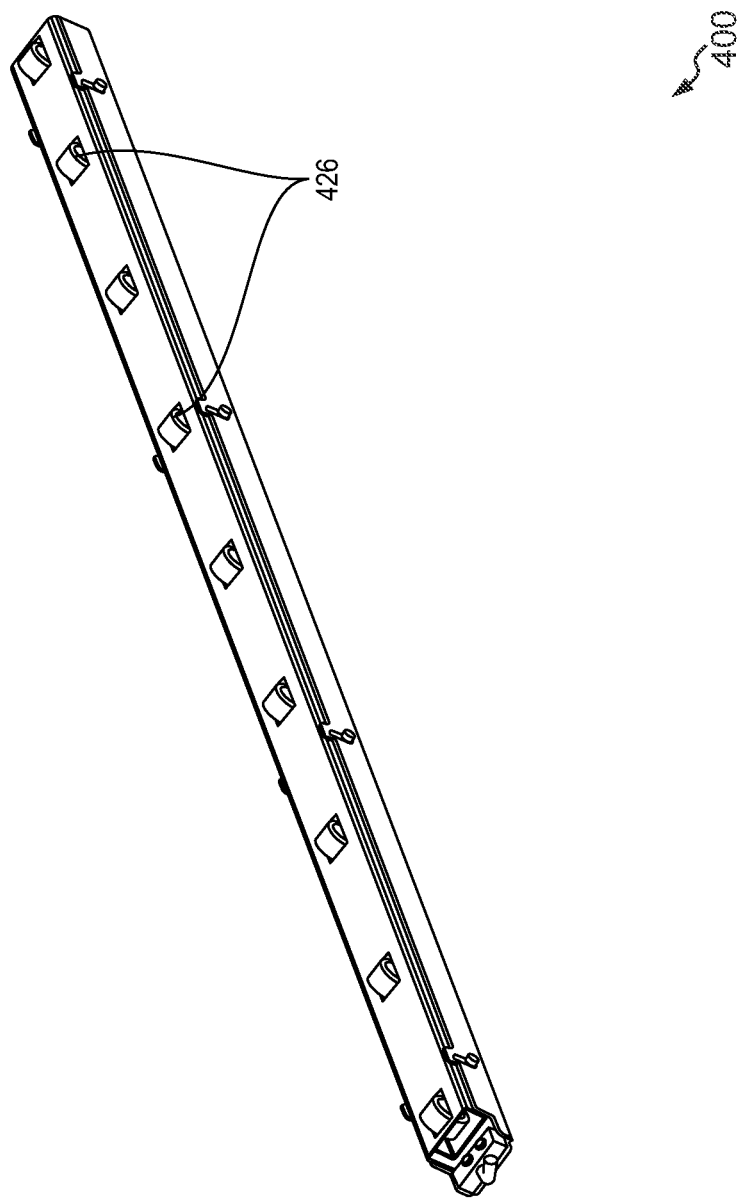

FUEL CELL ASSEMBLY FOR EASY REMOVAL AND INSTALLATION OF FUEL CELL SYSTEM

TECHNICAL FIELD

The present invention relates to the field of fuel cell assemblies and, more particularly, to a fuel cell assembly for easy removal and installation of fuel cell systems without damaging a fuel cell system.

BACKGROUND

Power enclosures or fuel cell enclosures on marine vessels can incorporate a fuel cell system (e.g., solid oxide fuel cell system, also known as SOFC system) positioned within a fuel cell assembly located on designated decks of the marine vessel. It is possible for fuel cell systems to contribute a significant percentage of the overall power for the vessel. However, it is desirable for the footprint occupied by the fuel cell system to be as small as possible so that more real estate on the marine vessel can be utilized for other functions (e.g., more cargo space, more passenger space, etc.). For deriving maximum power output for the marine vessel, power density is an important factor to be considered while installing the fuel cell system (interchangeably referred to as "fuel cell module" or "FCM") in the fuel cell assembly.

While fuel cell systems can be utilized to provide power to marine vessels, FCM performance can degrade over time, leading to a decline in power output for the vessel. Therefore, it is necessary to service or replace fuel cell systems as their performance degrades. Due to the considerable weight of the fuel cell system installed in a fuel cell assembly, removing or installing a fuel cell system is difficult. Moreover, a marked difference exists between installing FCMs in land-based locations and the installation of FCMs in marine vessels. Unlike non-marine installations, where a service aisle 6 to 8 feet wide is present between the fuel cell modules in adjacent rows of fuel cell assemblies, marine vessels can contain much narrower service aisles to accommodate high-density fuel cell installations.

With the narrower service aisle, removing or installing a fuel cell system in the fuel cell assembly is difficult. Unlike land-based installations where fork-lift mechanisms can be used to remove the FCM from its enclosure, a marine vessel may not accommodate the fork-lift mechanism due to load limits and the space constraints of raised floor construction.

One method for lifting a fuel cell system from its enclosure within tightly spaced fuel cell assembly units involves the use of a pallet jack assembly as shown in FIGS. 1A-1C. FIGS. 1A and 1B are schematic representations of a front view and side view of a fuel cell system 110 of a fuel cell assembly 100 accompanied by a pallet jack assembly 102, respectively, whereas FIG. 1C shows a perspective view of fuel cell system 110 accompanied by a pallet jack assembly 102. The pallet jack assembly 102 applies a lifting rig mechanism on the fuel cell system to move the fuel cell system from the fuel cell assembly.

As noted above, the space of the service aisle in marine vessels may not be large enough to accommodate the use of the pallet jack assembly, not to mention there should also be sufficient space for a field service technician to move in and out of the fuel cell system installation when servicing or replacing fuel cell systems in fuel cell assemblies. Further, the pallet jack assembly itself would occupy a large amount of space in a marine vessel, causing fewer fuel cell systems to be installed in the restrictive space of the marine vessel, thereby lowering the overall power output required to power the marine vessel.

Hence, there is a need for a fuel cell assembly that allows easy removal and replacement of fuel cell systems from fuel cell enclosures with narrow service aisles without risk of damage to equipment while still maintaining a high-density installation.

SUMMARY

Various embodiments of the present disclosure provide a fuel cell assembly for easy removal and installation of a fuel cell system without damaging a fuel cell system.

According to various embodiments, the present invention relates to a fuel cell assembly having a fuel cell system including a first base arrangement. The first base arrangement includes two surfaces, a first surface, and a second surface, whereas one or more first slots are configured between the two surfaces. The fuel cell system is configured on the second surface. The fuel cell assembly includes one or more first rolling members including a plurality of rollers, where the one or more first rolling members are provided into the one or more first slots.

Each of the one or more first rolling members is configured to be inflated and deflated. The inflating and deflating of each first rolling member facilitates movement of the plurality of rollers of each first rolling member into the plurality of holes and out of the plurality of holes, respectively. The movement of the rollers of the first rolling members out of the holes indicates that the rollers reside within the first base arrangement and do not pass through the holes. The movement of the plurality of rollers of each first rolling member into the plurality of holes and out of the plurality of holes enables the fuel cell system to move between a raised position and a lowered position. The raised position of the fuel cell system indicates a position in which the fuel cell system is in contact with the plurality of rollers, whereas the lowered position of the fuel cell system indicates a position in which the fuel cell system is out of contact with the plurality of rollers.

The fuel cell assembly further includes a cart assembly configured adjacent to the second base arrangement to receive the fuel cell system from the first base arrangement. The cart assembly comprises a second base arrangement and a set of wheels configured to the second base arrangement for the movement of the cart assembly inside the fuel cell assembly. The second base arrangement includes a first surface and a second surface, and one or more second slots configured between the two surfaces. The second surface includes a plurality of holes. The fuel cell assembly includes one or more second rolling members and each of the plurality of second rolling members may include a plurality of rollers. The second rolling members are provided into the one or more second slots.

Each of the one or more second rolling members is configured to be inflated and deflated. The inflating and deflating of each second rolling member facilitate the movement of the plurality of rollers of each second rolling member into the plurality of holes and out of the plurality of holes, respectively. The movement of the plurality of rollers of each first rolling member through the plurality of holes of the first base arrangement and the movement of the plurality of rollers of each second rolling member through the plu-rality of holes of the second base arrangement facilitate the fuel cell system to move between the first base arrangement and second base arrangement.

BRIEF DESCRIPTION OF THE FIGURES

For a more complete understanding of example embodiments of the present technology, reference is now made to the following descriptions taken in connection with the accompanying drawings in which:

FIG. 4 is a schematic representing a first or second rolling member of the proposed fuel cell assembly, in accordance with an embodiment of the present disclosure;

Figure 1A:
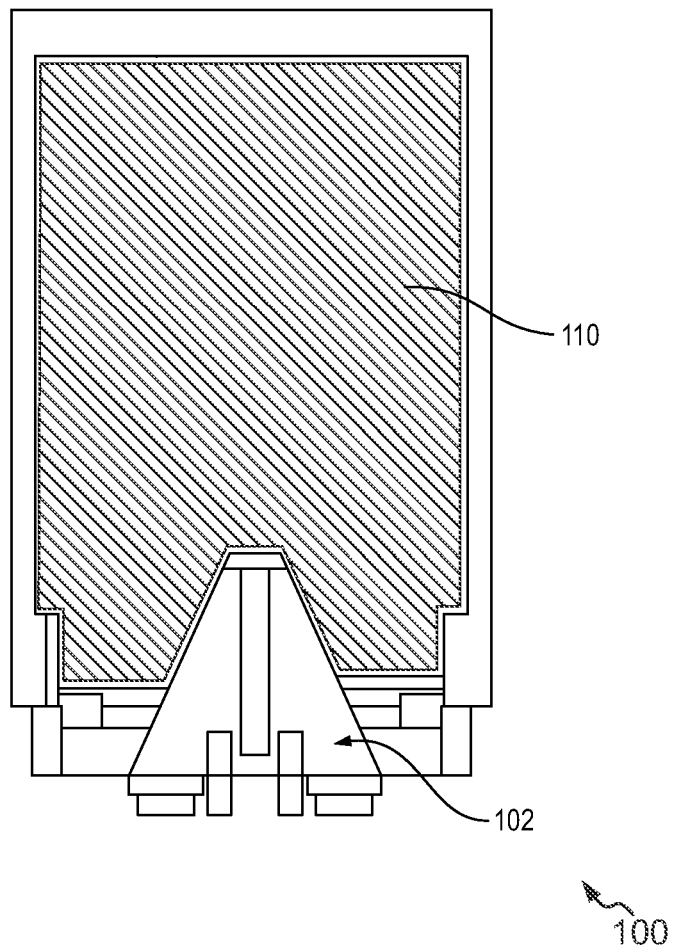
FIG. 1A is a schematic representing a front view of a fuel cell system of a fuel cell assembly employed with a pallet jack assembly.
Figure 1B:
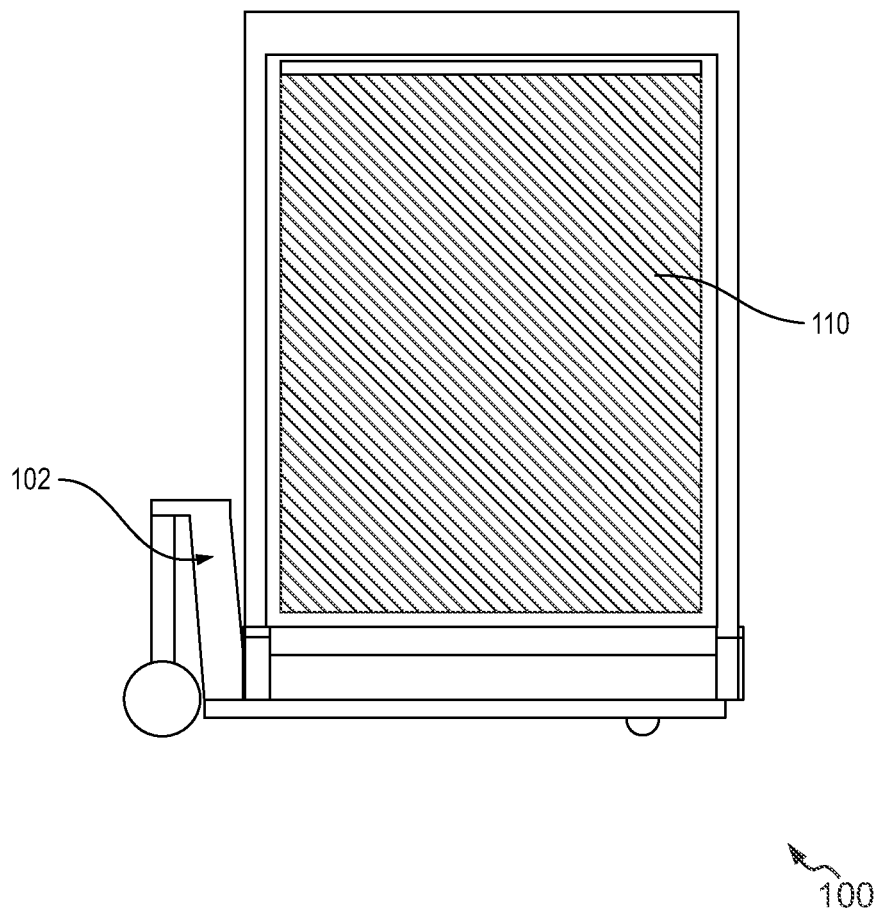
FIG. 1B is a schematic representing a side view of a fuel cell system of a fuel cell assembly employed with a pallet jack assembly.
Figure 1C:
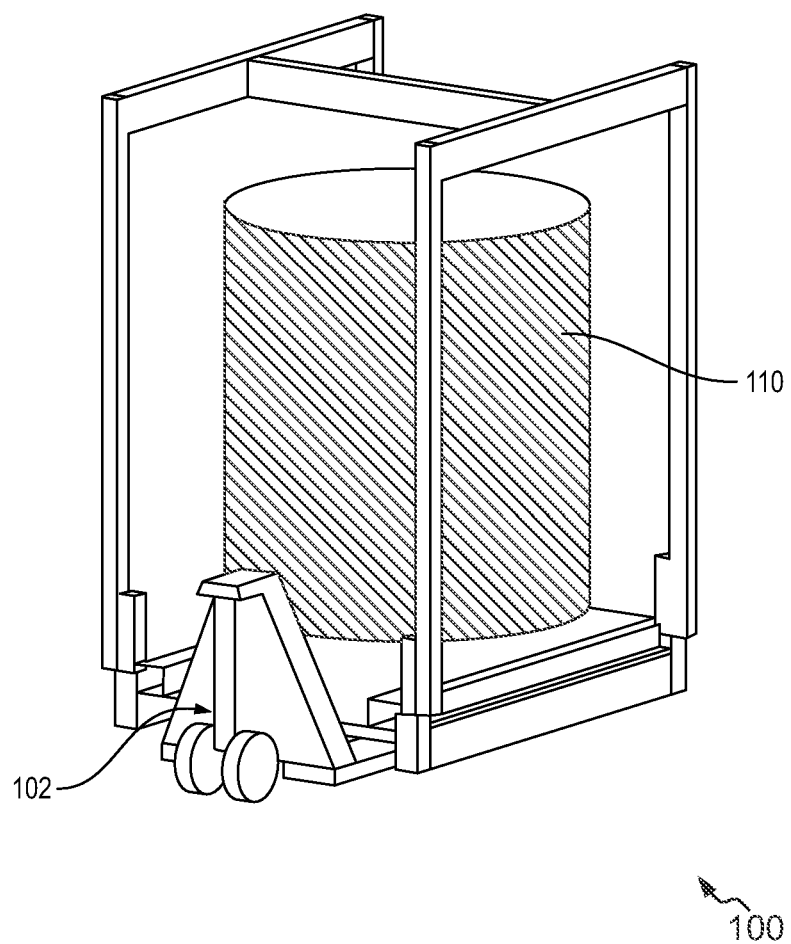
FIG. 1C is a schematic representing a perspective view of a fuel cell system of a fuel cell assembly employed with a pallet jack assembly.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification does not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

The terms "fuel cell system", "fuel cell module", and "FCM" may have been used interchangeably throughout the description, and they refer to a system containing one or more electrochemical cells that convert the chemical energy of a fuel (often hydrogen) and an oxidizing agent (often oxygen) into electricity through a pair of redox reactions.

The terms "marine power module" and "marine power enclosure" may have been used interchangeably throughout the description, and they refer to an enclosure housing the fuel cell system within the marine vessel.

Overview

Various example embodiments of the present disclosure provide a fuel cell assembly to provide easy removal and installation of a fuel cell system in a fuel cell assembly. The fuel cell assembly includes a first base arrangement for supporting a fuel cell system in the fuel cell assembly and one or more first slots configured in the first base arrangement. The first base arrangement includes a first surface and a second surface such that the second surface comprises a plurality of holes. The first slots are configured between the first surface and the second surface and the plurality of holes are located throughout the length of the first slot. The fuel cell system is supported on the second surface of the first base arrangement.

The fuel cell assembly further includes one or more first rolling members configured to be inserted into the one or more first slots. The one or more first rolling members are capable of inflating and deflating through a source connected to the first rolling members. The source may include, but is not limited to, a pneumatic cylinder to inflate or deflate the one or more first rolling members.

Each of the first rolling members includes a plurality of rollers configured to rotate about their respective rotation axes. The first rolling members are inserted into the respective slots provided in the first base arrangement. As a result, the rollers of the first rolling members are aligned in the same arrangement as the plurality of holes on the second surface. The first rolling members may be connected through a pneumatic mechanism to inflate and deflate the first rolling members. The pneumatic mechanism may utilize compressed air to inflate and deflate the first rolling members. Therefore, the first rolling member may be connected to a high-pressure bladder that may contain the compressed air or gas at high pressure, acting as a reservoir for quick and controlled release when needed.

Such inflation and deflation of each first rolling member facilitate movement of the plurality of rollers of each first rolling member into the plurality of holes and out of the plurality of holes, respectively. The movement of the rollers of the first rolling members out of the holes indicates that the rollers reside within the first base arrangement and do not pass through the holes. The movement of the plurality of rollers of each first rolling member into the plurality of holes and out of the plurality of holes enables the fuel cell system to move between a raised position and a lowered position. The raised position of the fuel cell system indicates a position in which the fuel cell system is in contact with the plurality of rollers, whereas the lowered position of the fuel cell system indicates a position in which the fuel cell system is out of contact with the plurality of rollers.

When the rollers of the first rolling members inflate through an inflating mechanism, the plurality of rollers of each of the first rolling members move out of the holes of the second surface of the first base arrangement. As a result, the fuel cell system, which was supported on the second surface of the first base arrangement, is now supported on the plurality of rollers of each of the first rolling members. The fuel cell system is now movable on a plurality of rollers. In this case, the plurality of rollers only rotate around their rotation axes and do not perform any translatory motion while moving the fuel cell over the plurality of rollers.

The fuel cell assembly may include a cart assembly configured adjacent to the first base arrangement to receive the fuel cell system from the first base arrangement. The cart assembly may include a second base arrangement and a set of wheels configured with the second base arrangement. The second base arrangement includes a first surface and a second surface and the second surface includes a plurality of holes. The cart assembly may also include one or more second slots configured between the first surface and the second surface of the second base arrangement. The plurality of holes are located throughout the length of the second slots. Further, one or more second rolling members are provided in the one or more second slots of the cart assembly, where each of the second rolling members includes a plurality of rollers.

Each of the one or more second rolling members is capable of being inflated and deflated when a pneumatic source is connected to the one or more second rolling members. The inflating and deflating of each second rolling member facilitate the movement of the plurality of rollers of each second rolling member into the plurality of holes and out of the plurality of holes, respectively. The movement of the plurality of rollers of each first rolling member through the plurality of holes of the first base arrangement and the movement of the plurality of rollers of each second rolling member through the plurality of holes of the second base arrangement facilitate the fuel cell system to move between the first base arrangement to the second base arrangement. During the movement of the fuel cell system from the first base arrangement to the second base arrangement, both the one or more first rolling members and the one or more second rolling members are in the inflated position.

Before the movement of the fuel cell system from the first base arrangement to the second base arrangement, the cart assembly needs to align itself with the first base arrangement. Therefore, the cart assembly is equipped with a lifting arrangement. The lifting arrangement is configured to lift the cart assembly in a vertical direction such that the second surface of the second base arrangement of the cart assembly matches the level of the second surface of the first base arrangement. In other words, the lifting arrangement may adjust the height of the second base arrangement such that the first base arrangement and the second base arrangement are aligned to the same height to move the fuel cell system between the first base arrangement and the second base arrangement. The lifting arrangement may include a set of hydraulic cylinders coupled with a pump through a manifold to move the second base arrangement in a vertical direction upwardly or downwardly. Alternatively or additionally, the lifting arrangement includes levelling feet with threaded shafts to be screwed up and down to move the second base arrangement in a vertical direction upwardly or downwardly.

Upon alignment of the first base arrangement with the second base arrangement, the fuel cell system moves over the rollers of the first rolling members and the second rolling members. While moving the fuel cell system over the rollers of the first and second rolling members, the rollers of the first and second rolling members rotate about their respective axes but do not perform any translatory motion. When the fuel cell system is moved from the first base arrangement to the second base arrangement, the first and second rolling members may be deflated. As a result, the rollers of the first rolling members move inside the first base arrangement and the rollers of the second rolling members move inside the second base arrangement.

When the fuel cell system moves to the second base arrangement, the locking mechanism is employed to ensure that the fuel cell system is correctly positioned while moving the cart assembly. The locking mechanism may include a travel stop to prevent the movement or displacement of the fuel cell system. The design of a travel stop can vary, but it typically involves a mechanism that engages with the container or cart to restrict its motion. The travel stop may include but is not limited to, locking pins, clamps, or other securing elements that physically hinder the movement of the container. The purpose of the travel stop is to enhance safety, stability, and precision in positioning, especially when transporting or handling items in an industrial or logistical setting.

Upon locking the fuel cell system on the cart assembly, the cart assembly can be moved to a desired location. To facilitate the movement of the cart assembly, a track may be arranged on a walkway with embedded grating. The cart assembly should be capable of traversing along this track by utilizing a set of wheels integrated with the second base arrangements.

Figure 2A:
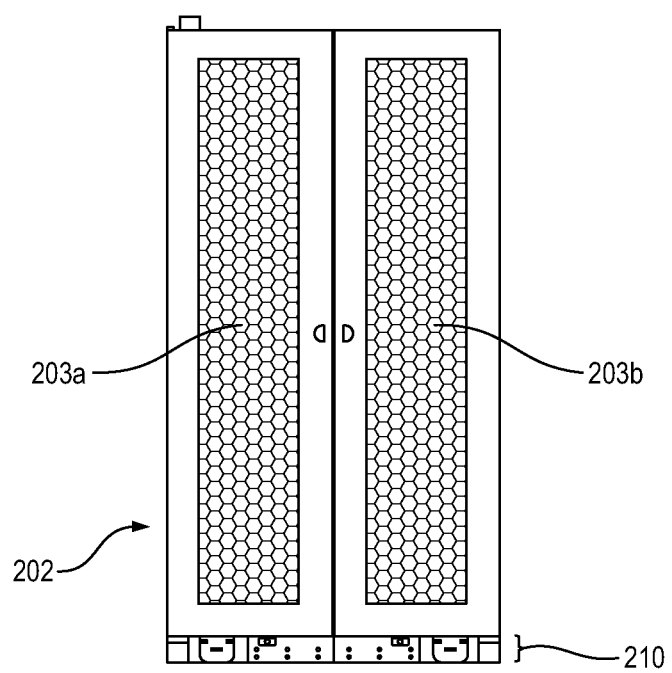
FIG. 2A is a schematic representing a fuel cell enclosure of a proposed fuel cell assembly in a closed position, in accordance with embodiments of the present disclosure.
Figure 2B:
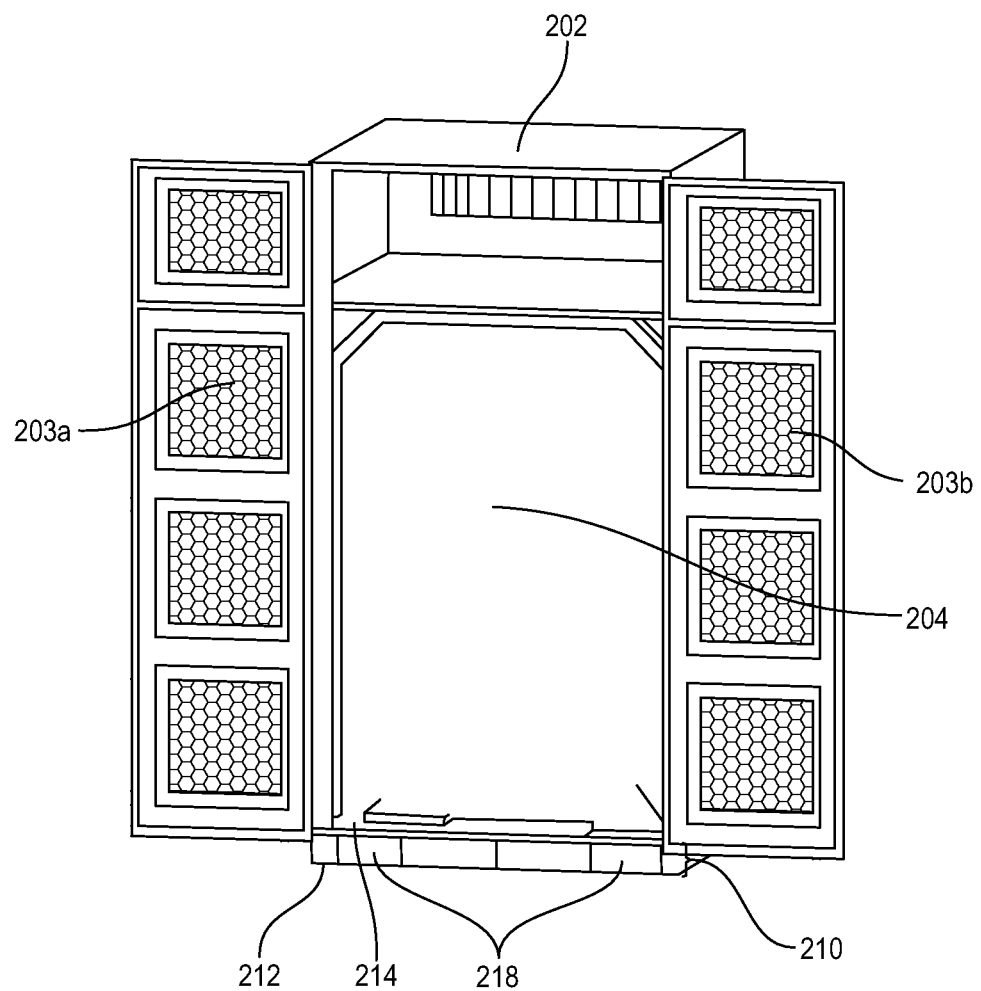
FIG. 2B is a schematic representing a fuel cell enclosure of a proposed fuel cell assembly in an opened position, in accordance with embodiments of the present disclosure.

FIGS. 2A and 2B depict an enclosure of a fuel cell system of the proposed fuel cell assembly in a closed position and an opened position respectively, in accordance with an embodiment of the present disclosure. The fuel cell assembly as proposed, may include a fuel cell enclosure 202 forming a protective and functional structure designed to house and support fuel cell systems. The fuel cell enclosure 202 includes a double-door arrangement including doors 203a and 203b (collectively referred to as doors 203 and individually referred to as door 203) configured with a perforated structure for proper ventilation and cooling systems. Each of the doors 203 may be hinged on the sides, allowing them to swing open from the center. These enclosures help dissipate heat generated during the electrochemical reactions within the fuel cells, ensuring optimal operating conditions.

As illustrated in the FIG. 2B, the fuel cell system 204 is configured on a first base arrangement 210 of the fuel cell enclosure 202. The first base arrangement 210 may include two surfaces, a first surface 212, and a second surface 214. For example, the second surface 214 may be the top surface on which the fuel cell system 204 is supported and the first surface 212 may be the bottom surface of the first base arrangement 210. The fuel cell assembly may include one or more first slots 218 (interchangeably referred to as fork tubes 218) configured between the first surface 212 and the second surface 214. The provision of the fuel cell enclosure 202 provided separately for each fuel cell system 204 enables the independent transportation, replacement, or removal of the fuel cell system from the fuel cell enclosure, without requiring the transportation, replacement, or removal of other fuel cell systems.

Figure 3:
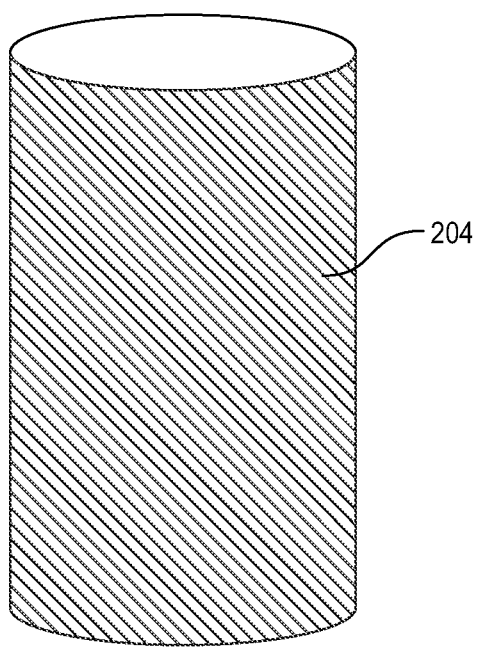
FIG. 3 is a schematic representing a side view of a fuel cell system of a fuel cell assembly, in accordance with embodiments of the present disclosure.

FIG. 3 is a schematic representing a side view of a fuel cell system of a fuel cell assembly, in accordance with an embodiment of the present disclosure. The fuel cell system 204 may include a system containing one or more electrochemical cells that convert the chemical energy of a fuel (often hydrogen) and an oxidizing agent (often oxygen) into electricity through a pair of redox reactions. In other words, the fuel cell system may include one or more fuel cell stacks located in a hot box i.e., a thermally insulated container. The fuel cell system 204 may be configured in the fuel cell assembly such that it can easily be removed, transported, and replaced from the fuel cell enclosure 202. The fuel cell assembly may include any desired number of fuel cell systems, such as 2-24 fuel cell systems.

FIG. 4 is a schematic representing the first or second rolling member of the proposed fuel cell assembly, in accordance with an embodiment of the present disclosure. The fuel cell assembly may include a rolling member 400 that may include a plurality of rollers 426 configured at the predefined positions along a longitudinal direction of the rolling member referred 400. The plurality of rollers 426 may be configured to rotate about their corresponding axis. The rolling member 400 may be mechanically coupled with a pneumatic source to allow the rolling member to inflate and deflate in a lateral direction and perpendicular to the longitudinal direction. The pneumatic source may be configured to inflate or deflate the rolling member using compressed air. Therefore, an air compressor can be used as the pneumatic source to generate compressed air at the required pressure. The pneumatic source may be a high-pressure bladder. The high-pressure bladder may include a flexible and inflatable structure designed to contain fluid at high pressure. For example, the fuel cell assembly 200 may also include a system controller configured to operate the pneumatic source to inflate or deflate one or more rolling members. The system controller may be implemented through one or more processors and storage mediums such as memory.

Figure 5A:
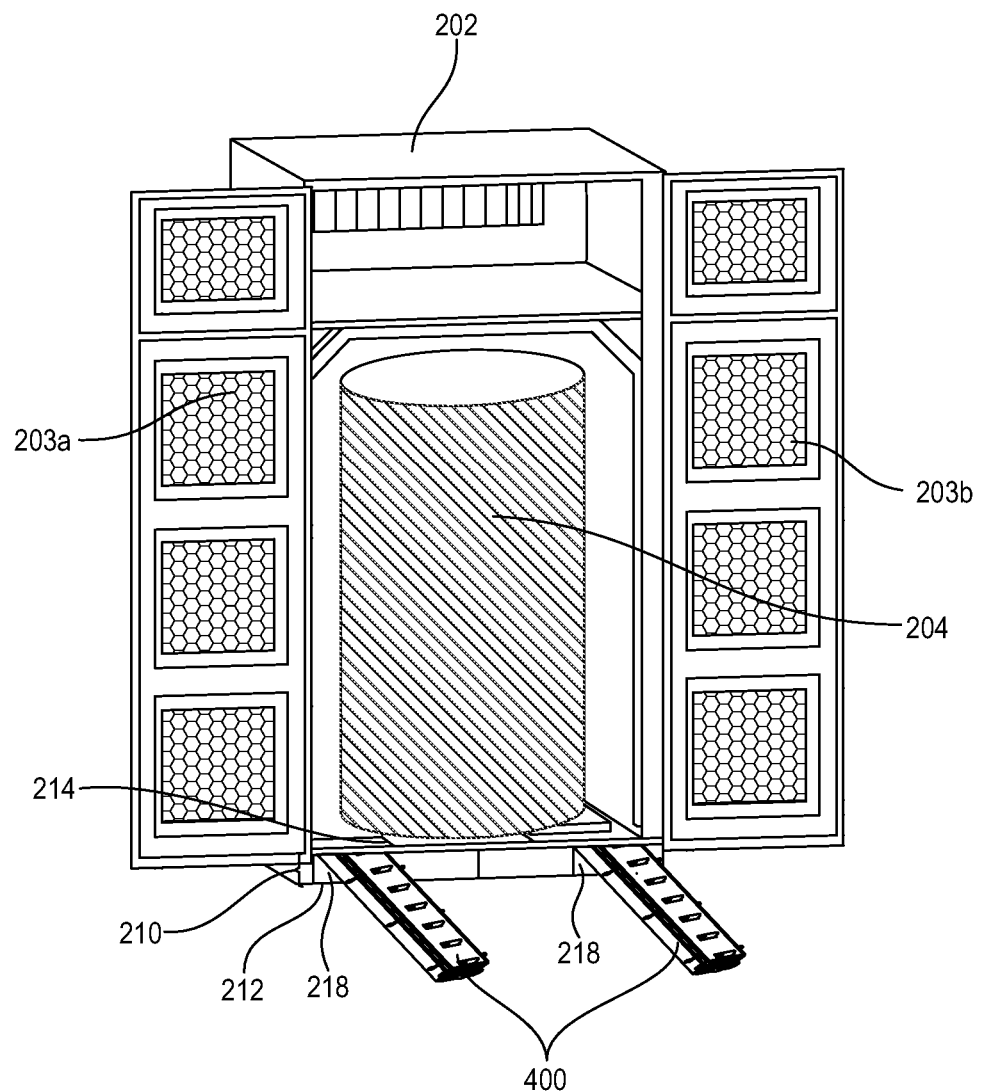
FIG. 5A is a schematic representing an insertion of a first rolling member in a first base arrangement of a proposed fuel cell assembly when a fuel cell system is housed within a fuel cell enclosure, in accordance with an embodiment of the present invention.
Figure 5B:
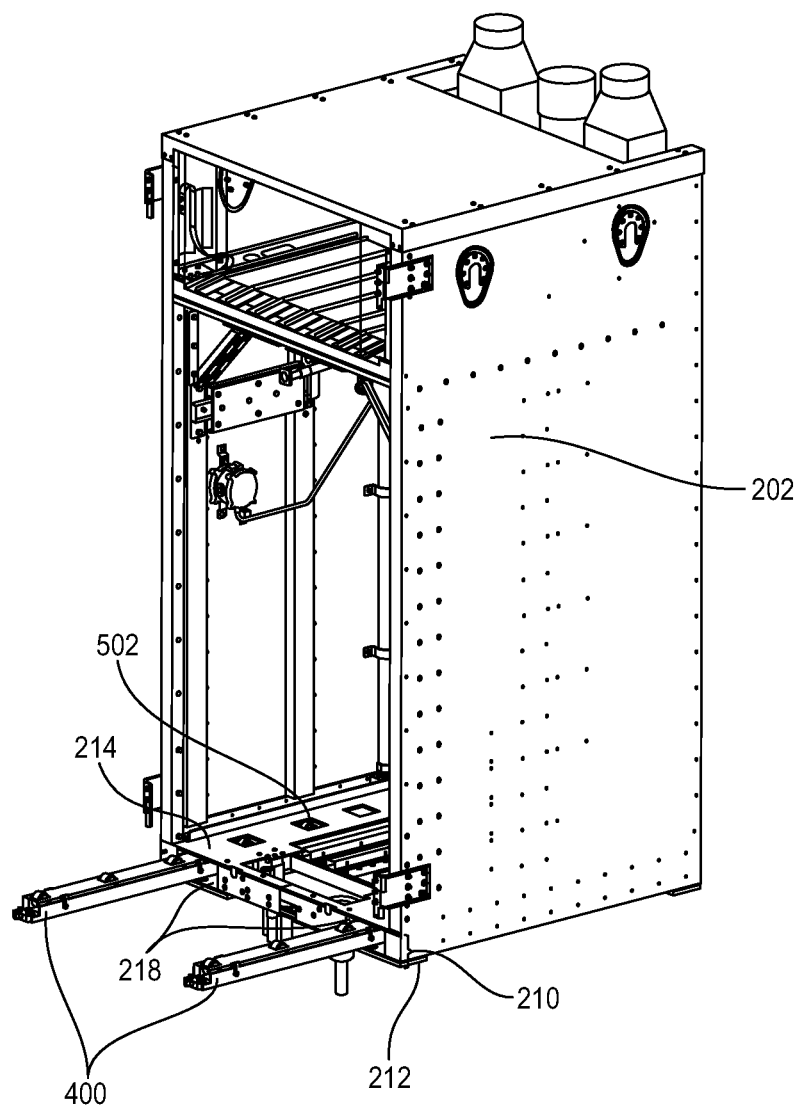
FIG. 5B is a schematic representing an insertion of a first rolling member in a first base arrangement of a proposed fuel cell assembly when a fuel cell system is not housed within a fuel cell enclosure, in accordance with an embodiment of the present invention.

FIGS. 5A and 5B are schematic representations of the insertion of a first rolling member in the first base arrangement of the proposed fuel cell assembly, in accordance with an embodiment of the present invention. FIG. 5A shows the insertion of the first rolling member into the first base arrangement when the fuel cell system is housed within the fuel cell enclosure. The fuel cell enclosure 202 may include a first base arrangement 210 that may include a first surface 212 and a second surface 214. As illustrated in FIG. 5A, a set of first slots 218 are provided between the first surface 212 and the second surface 214. The first rolling members 400 can be inserted into the first slots 218 such that each first rolling member 400 is inserted in one slot 218. Thus, there exists a one-to-one relationship between the slots and the first rolling members. Upon insertion of the first rolling members 400 into the slots 218, the first rolling members may be coupled with a pneumatic source to inflate or deflate the first rolling members.

FIG. 5B shows the insertion of a first rolling member into the first base arrangement when the fuel cell system is not housed within the fuel cell enclosure. As illustrated in FIG. 5B, the second surface 214 of the first base arrangement may include a plurality of holes 502 on the second surface 214, whereas the first rolling member 400 may include a plurality of rollers configured at predefined positions of the first rolling member along the length of the first rolling member 400. The arrangement of the plurality of rollers in the one or more first rolling members 400 at predefined locations corresponds to an arrangement of the plurality of holes 502 on the second surface of the first base arrangement. As a result, when the first rolling member 400 is inserted into the slot 218 provided between the first surface 212 and the second surface 214 of the first base arrangement, the plurality of rollers of the first rolling member 400 align with the plurality of holes 502 in the second surface 214. In this case, as the first rolling member 400 is in a deflated position, the rollers of the first rolling member 400 lie within the first base arrangement and do not extend into the holes 502 of the first base arrangement. When the first rolling member 400 is inflated (e.g., with a pneumatic source), the rollers of the first rolling members may move into the holes of the first base arrangement. In other words, when the first rolling member 400 is inflated or deflated, the plurality of rollers 426 of each first rolling member 400 may move into the holes 502 and move out of the plurality of holes 502 of the second surface, respectively. The movement of the rollers of the first rolling members out of the holes indicates that the rollers reside within the first base arrangement and do not pass through the holes. If the fuel cell system is housed within the fuel cell enclosure 202, the movement of the plurality of rollers of each first rolling member into the plurality of holes and out of the plurality of holes enables the fuel cell system to move between a raised position and a lowered position. The raised position of the fuel cell system indicates a position in which the fuel cell system is in contact with the plurality of rollers, whereas the lowered position of the fuel cell system indicates a position in which the fuel cell system is out of contact with the plurality of rollers.

Figure 6A:
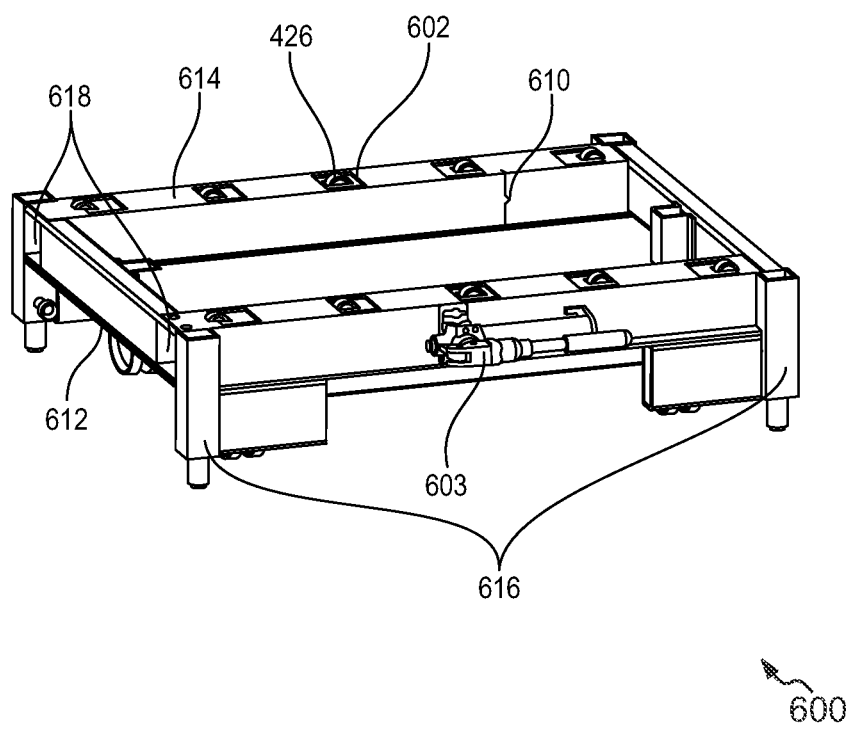
FIGS. 6A and 6B are schematic representations of perspective views of a cart assembly, in accordance with an embodiment of the present invention.
Figure 6B:
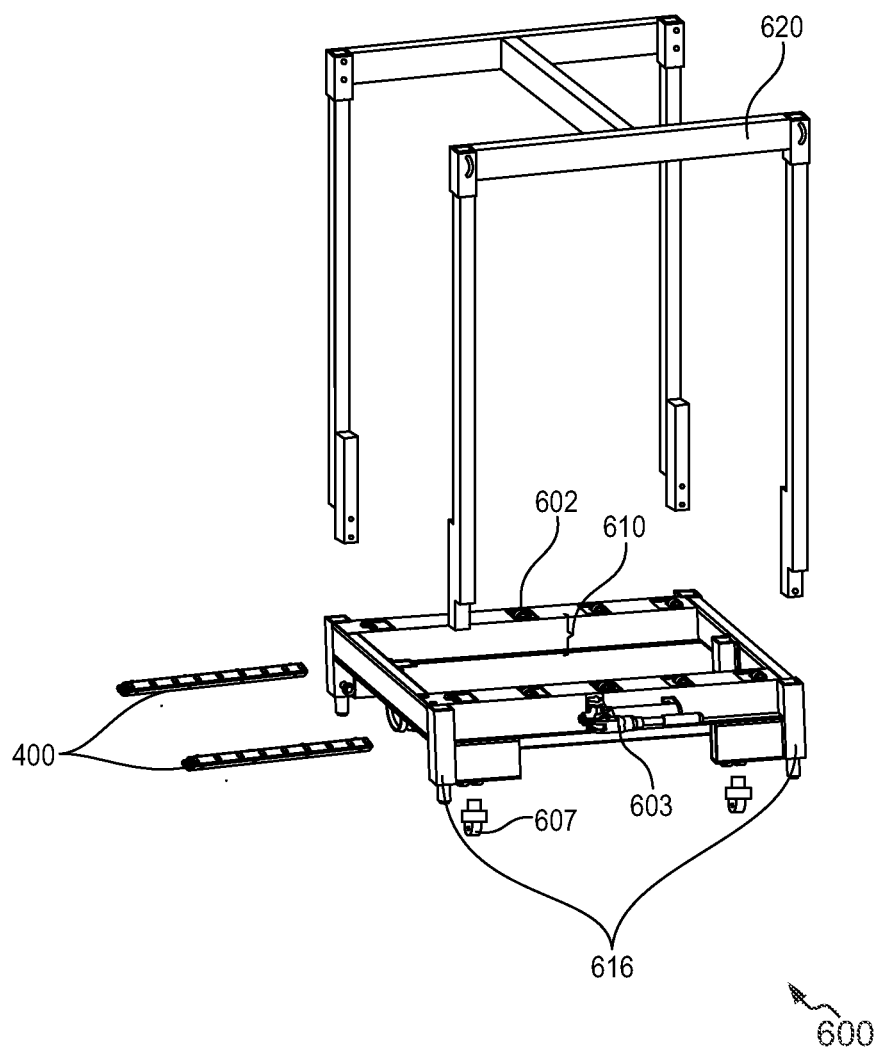

FIGS. 6A and 6B are schematic representations of perspective views of a cart assembly, in accordance with an embodiment of the present invention. The cart assembly 600 may be configured adjacent to the first base arrangement to allow movement of the fuel cell system from the first base arrangement to the cart assembly 600. As illustrated in FIGS. 6A and 6B, the cart assembly 600 may include a second base arrangement 610, and a set of wheels 607 configured with the second base arrangement 610. The set of wheels 607 may be inverted V with V-groove wheels, or U-shaped with standard wheels.

The design and features of the second base arrangement 610 are similar to the first base arrangement. The second base arrangement 610 may include a first surface 612 and a second surface 614. The cart assembly may include one or more second slots 618 configured between the first surface 612 and the second surface 614 of the second base arrangement. The second surface 614 may include a plurality of holes 602 located along the length of the second slot 618. The cart assembly also includes one or more second rolling members 400 provided in the one or more second slots 618. The arrangement of the second rolling member 400 with the second slots 618 is similar to the arrangement of the first rolling member with the first slots. Each second rolling member may include a plurality of rollers 426 such that each of the rollers is configured to rotate about their respective rotation axes.

In an embodiment, the second rolling member may be connected to a pneumatic source similar to the pneumatic source connected with the first rolling member. As a result, each of the one or more second rolling members 400 can be inflated and deflated. In other words, the second rolling members may be connected through a pneumatic mechanism to inflate and deflate the second rolling members. The pneumatic mechanism may utilize compressed air to inflate and deflate the second rolling members. Therefore, the second rolling member may be connected to a high-pressure bladder that may contain compressed air or gas at high pressure, acting as a reservoir for quick and controlled release when needed. The inflating and deflating of each second rolling member 400 facilitate movement of the plurality of rollers of each second rolling member into the plurality of holes and out of the plurality of holes, respectively. The location of the rollers of the second rolling members out of the holes indicates that the rollers reside within the second base arrangement and do not pass through the holes.

As illustrated in FIG. 6B, the cart assembly 600 may include a lifting frame 620 that may be configured with the second base arrangement 610. The lifting frame 620 may facilitate the positioning of the fuel cell system while moving the cart assembly. The cart assembly may include a lifting arrangement configured to move the second base arrangement 610 in a vertical direction to align the second base arrangement with the first base arrangement at the same height level. The lifting arrangement may include levelling feet configured at each corner of the second base arrangement. The levelling shaft may be coupled with threaded shafts that can be screwed up or down to adjust the level and height of the second base arrangement 610. Alternatively, the lifting arrangement may include a set of hydraulic cylinders 616 such that one hydraulic cylinder is configured at each corner of the second base arrangement 610, as illustrated in FIG. 6A. All four cylinders may be coupled to a pump 603 to move the second base arrangement in the vertical direction. In particular, manually operating pump 603 may raise the cart assembly off the floor to the appropriate height. The pump 603 may include an opening control valve knob on the pump that allows it to move back to the original height. The coupling of the pump and hydraulic cylinder with a second base arrangement allows more rapid height adjustment.

Figure 7:
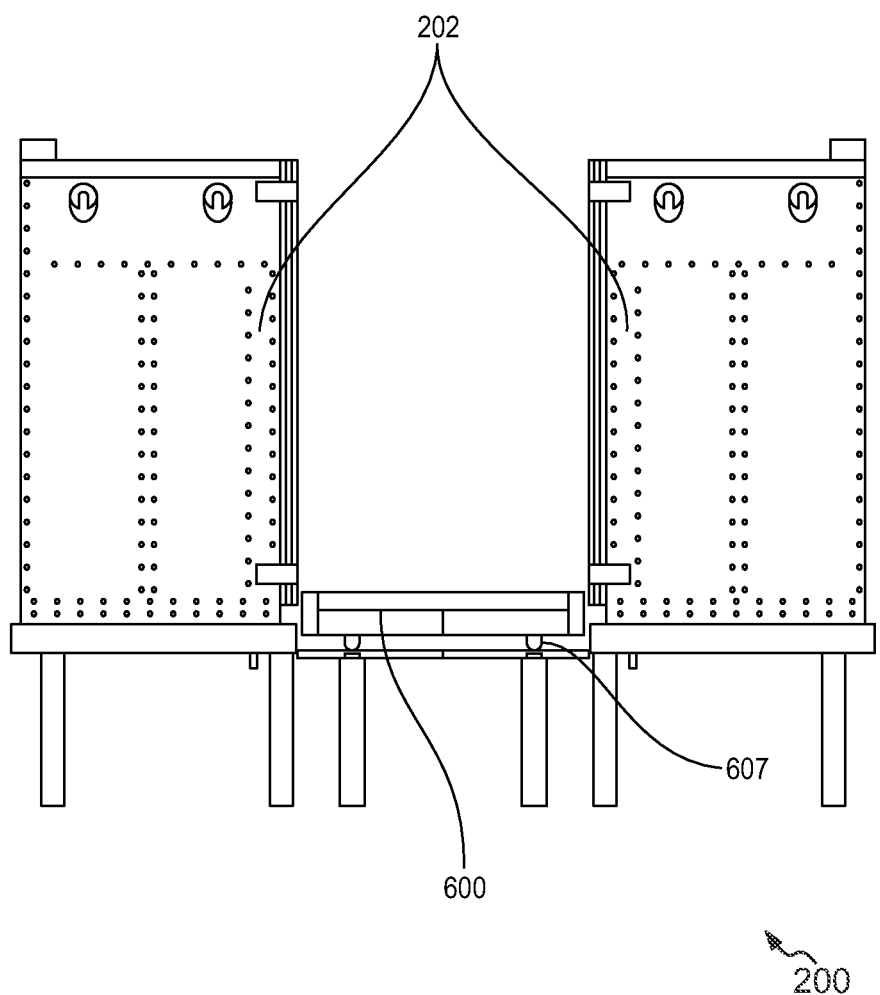
FIG. 7 is a schematic representing a cart assembly configured adjacent to fuel cell enclosures, in accordance with an embodiment of the present invention.
Figure 11:
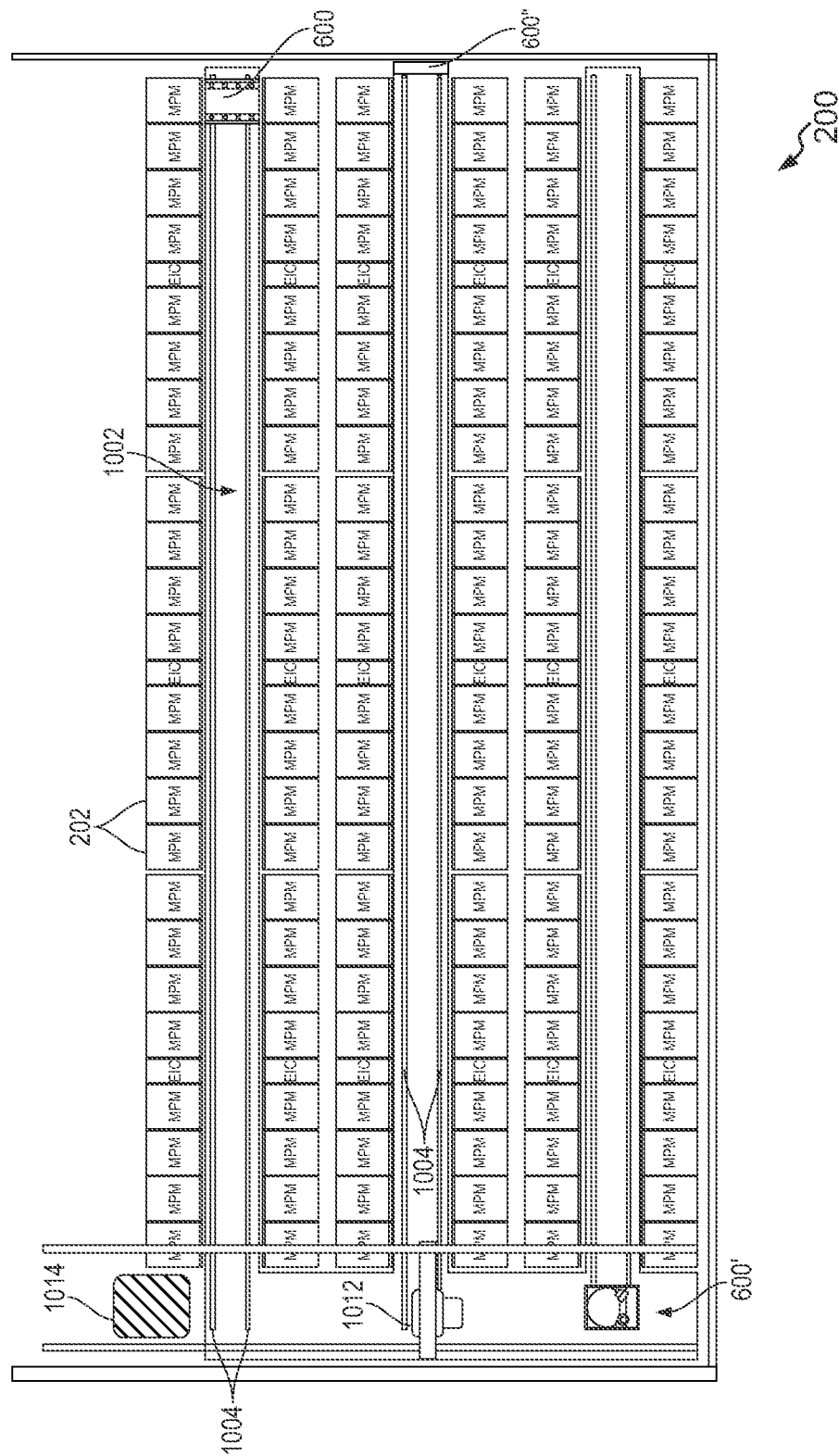
FIG. 11 is a schematic representing a layout of a fuel cell installation, in accordance with an embodiment of the present invention.

FIG. 7 is a schematic representing a cart assembly configured adjacent to two fuel cell enclosures, in accordance with an embodiment of the present invention. When a fuel cell system is to be removed from a fuel cell enclosure, the cart assembly may be brought adjacent to the fuel cell enclosure 202 as illustrated in FIG. 7. The fuel cell enclosures 202 are placed in rows arranged in close proximity to each other to accommodate spatial limitations in various applications, such as on marine vessels as shown in FIG. 11. Therefore, the spacing between the two rows of the fuel cell system is designed to accommodate the cart assembly at its maximum extent, as shown in FIG. 7. On both sides of the cart assembly 600, the fuel cell enclosures 202 are configured, each housing a respective fuel cell system. Thus, the cart assembly can be configured to be loaded with the fuel cell system from either side of the cart assembly. The cart assembly 600 can effectively be loaded or unloaded with a fuel cell system in narrower regions such as in marine applications, facilitating easy transportation of the fuel cell system for servicing, removal, replacement, and installation.

Once the cart assembly 600 moves adjacent to a fuel cell enclosure 202, a holding mechanism may be employed in the cart assembly 600 to hold the cart stationary for effective movement of the fuel cell system 204 from the fuel cell enclosure 202 to the cart assembly 600 without damaging the fuel cell system 204. When the cart assembly 600 is moved to a position adjacent to the fuel cell enclosure 202 to which the fuel cell system 204 is to be replaced, the height of the cart assembly 600 is adjusted to align the second base arrangement 610 of the cart assembly 600 to the first base arrangement 210 of the fuel cell enclosure 202. Upon aligning the second base arrangement 610 to the first base arrangement 210 at the same height, the first rolling member 400 is inserted in the first base arrangement 210 of the fuel cell enclosure 202 and the second rolling member 400 is inserted in the second base arrangement 610 of the cart assembly 600. Alternatively, the adjustment of height can be done after the insertion of the first rolling member 400 in the first slots 218 provided in the first base arrangement 210 and/or the insertion of the second rolling member 400 in the second slots 618 provided in the second base arrangement 610.

When the height of the cart assembly 600 is adjusted to align the cart assembly 600 to the same height as of the first base arrangement 210, and the first and second rolling members are inserted into the first base arrangement 210 and the second base arrangement 610, respectively, the first and second members are allowed to inflate through a pneumatic mechanism. The pneumatic mechanism has been previously discussed and is not elaborated herein for the sake of brevity.

As a result of the inflation of the first and second rolling members, the rollers 426 of the first rolling member 400 move into the holes 502 of the second surface 214 of the first base arrangement 210, and the rollers 426 of the second rolling member 400 move into the holes 602 of the second surface 614 of the second base arrangement 610. As a result, the fuel cell system 204, which was supported on the second surface 214 of the first base arrangement 210, is now supported on the rollers of the first rolling member. In an embodiment, when the fuel cell system 204 is supported on the rollers of the first rolling member, the fuel cell system 204 may lose contact with the second surface 214 of the first base arrangement 210, causing easy movement of the fuel cell system 204 without any friction between the bottom surface of the fuel cell system 204 and the second surface 214 of the first base arrangement 210. As the fuel cell system 204 is supported on the rollers of the first rolling member, a small amount of force is required to move the fuel cell system from the first base arrangement. Further, the rollers of the second rolling members are also in inflated positions and therefore, the fuel cell system 204 can easily be moved from the first base arrangement 210 to the second base arrangement 610 over the rollers of the first and second rolling members. A service person can pull the fuel cell system easily towards the cart assembly 600 in order to move the fuel cell system 204 to the cart assembly 600 over the rollers of the first and second rolling members. While moving the fuel cell system, each of the rollers of the first and second rolling members rotates about the respective rotation axis and does not perform any translatory motion.

Figure 8:
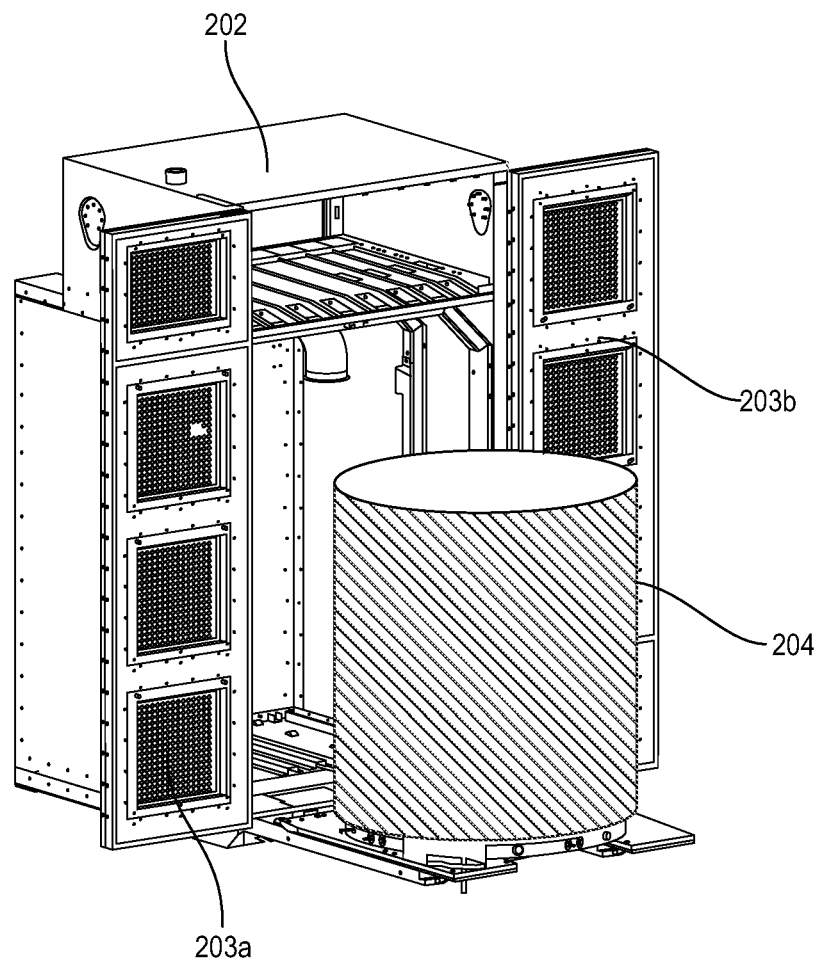
FIG. 8 is a schematic representing a movement of the fuel cell system from the first base arrangement of the fuel cell enclosure to the cart assembly, in accordance with an embodiment of the present invention.
Figure 9A:
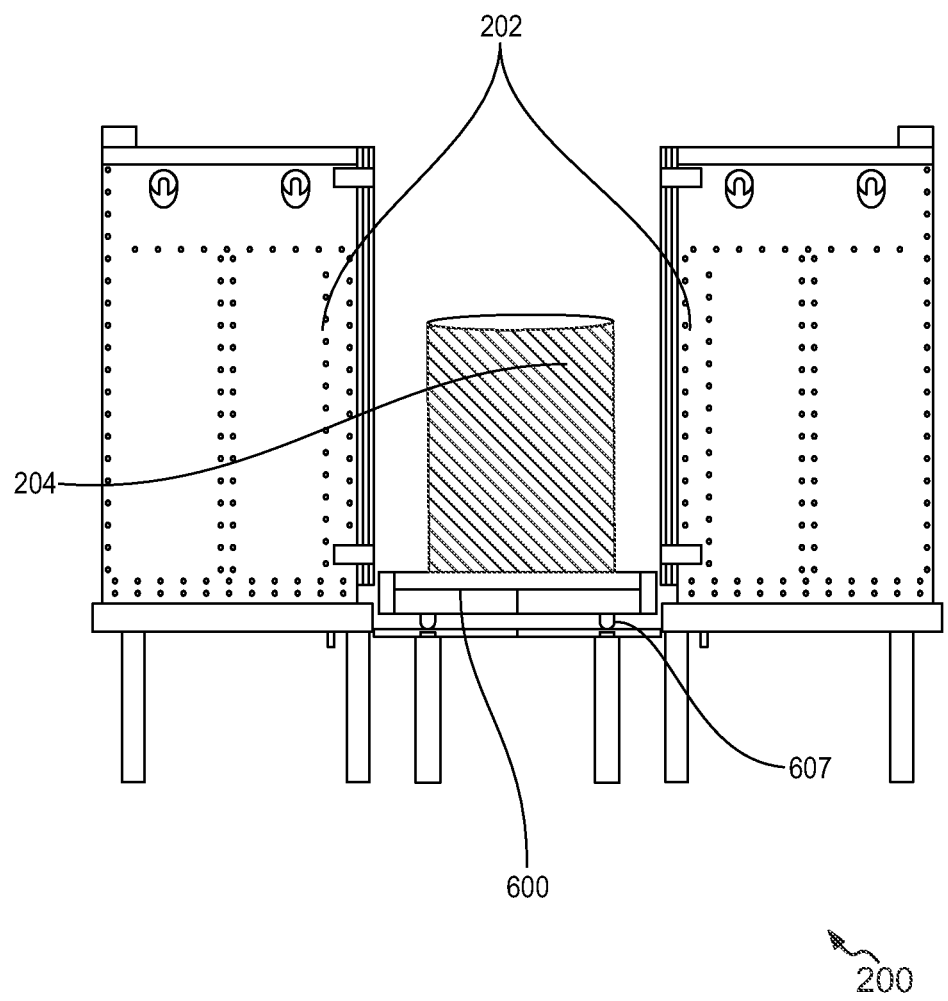
FIG. 9A is a schematic of a front view of a cart assembly configured adjacent to fuel cell enclosures when the cart assembly is loaded with a fuel cell system, in accordance with an embodiment of the present invention.
Figure 9B:
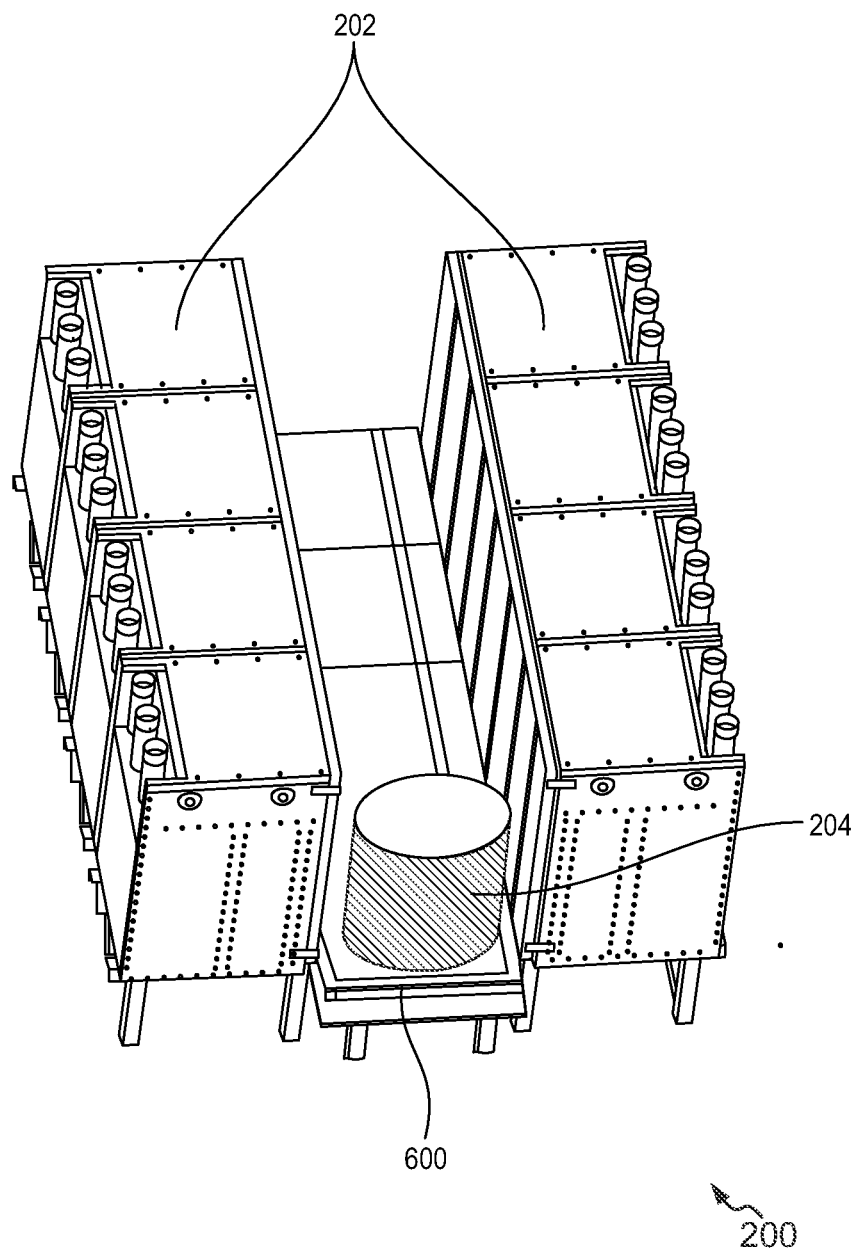
FIG. 9B is a schematic of a perspective view of a cart assembly configured adjacent to fuel cell enclosures when the cart assembly is loaded with a fuel cell system, in accordance with an embodiment of the present invention.
Figure 10:
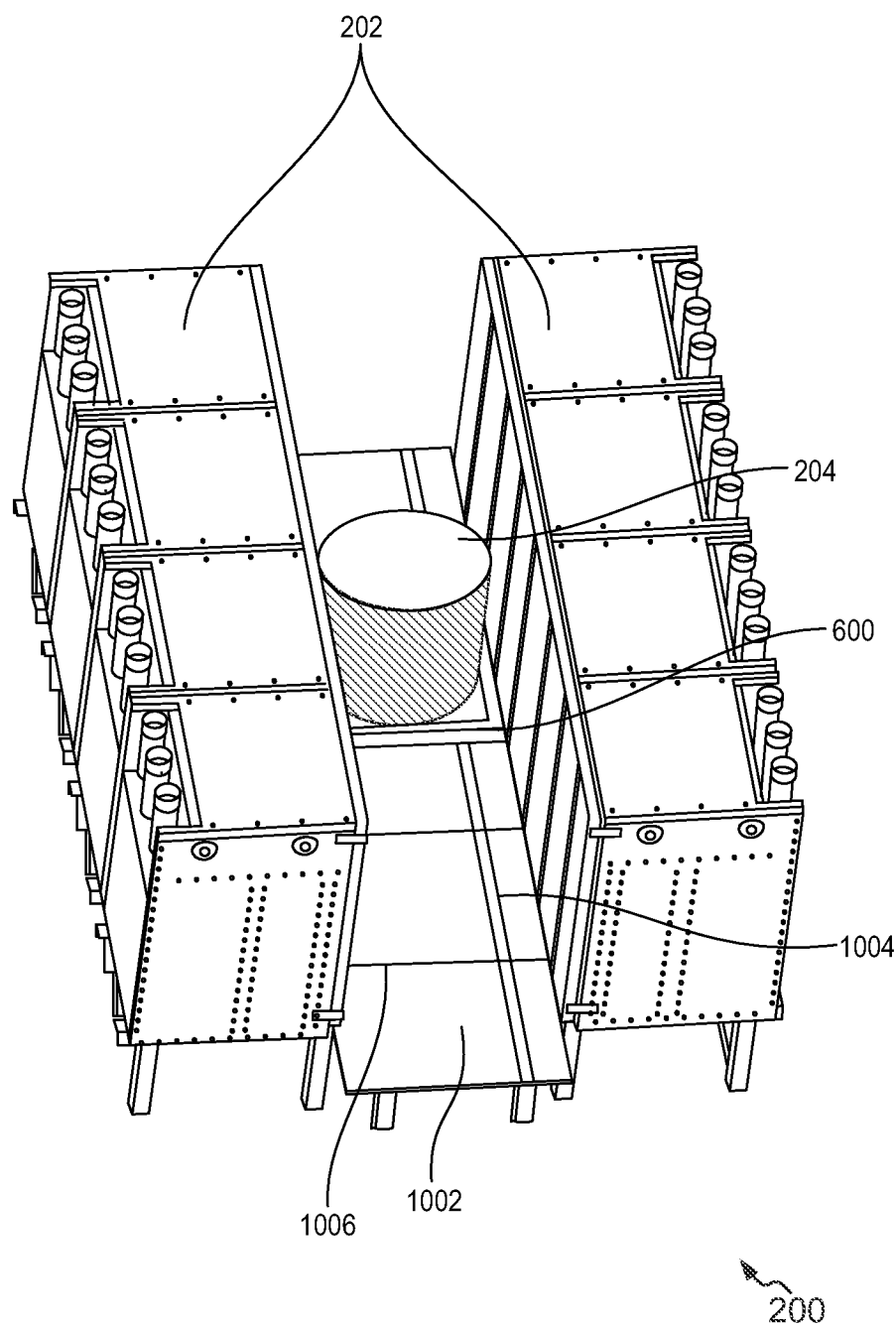
FIG. 10 is a schematic representing movement of the cart assembly on the track upon loading of the cart assembly, in accordance with an embodiment of the present invention.

When the fuel cell system is completely moved to the second base arrangement as shown in FIGS. 8, 9, and 10, the fuel cell system is supported by the rollers of the second rolling members. In this case, the fuel cell system 204 may not be in contact with the second surface 614 of the second base arrangement 610. However, when the second rolling members are deflated, the fuel cell system 204 comes in contact with the second surface 614 of the second base arrangement 610 as shown in FIGS. 9A and 9B.

The fuel cell system 204 generally has a considerable weight, therefore, there is no special requirement for securing the fuel cell system 204 in the cart assembly, once the cart assembly is loaded with the fuel cell system. However, in certain conditions, the fuel cell system may include a "travel stop" to secure the fuel cell system on the cart assembly to provide an additional layer of protection to prevent potential damage to the fuel cell system. In some instances, guide rails are configured on the sides of the cart assembly to ensure that the fuel cell system maintains a centered position as it rolls onto the cart. When the fuel cell system is secured on the cart assembly, the fuel cell system 204 is ready for transport.

In another case, where a fuel cell system 204 is to be installed from a fuel cell enclosure 202, a fuel cell system 204 secured in the cart assembly 600 may be brought adjacent to the fuel cell enclosure 202. The cart assembly 600 can be configured to be unloaded with the fuel cell system from either side of the cart assembly 600. Once the cart assembly 600 moves adjacent to a fuel cell enclosure 202, a holding mechanism may be employed in the cart assembly 600 to hold the cart stationary for effective movement of the fuel cell system from the cart assembly 600 to the fuel cell enclosure 202 without damaging the fuel cell system 204. When the cart assembly 600 is moved adjacent to a fuel cell enclosure 202 in which the fuel cell system 204 is to be installed, then the height of the cart assembly 600 would be adjusted to align the second base arrangement 610 of the cart assembly 600 to the first base arrangement 210 of the fuel cell enclosure 202. Upon aligning the second base arrangement to the first base arrangement at the same height, the first rolling member is inserted in the first base arrangement of the fuel cell enclosure and the second rolling member is inserted in the second base arrangement of the cart assembly. Alternatively, the adjustment of height can be done after the insertion of the first rolling member in the slots provided in the first base arrangement and/or the insertion of the second rolling member in the slots provided in the second base arrangement.

When the height of the cart assembly 600 is adjusted to align the cart assembly to the same height as of the first base arrangement 210, and the first and second rolling members are inserted into the first base arrangement 210 and the second base arrangement 610, respectively, the first and second rolling members are allowed to inflate through a pneumatic mechanism. As a result of the inflation of the first and second rolling members, the rollers of the first rolling member move into the holes of the second surface of the first base arrangement, and the rollers of the second rolling member move into the holes of the second surface of the second base arrangement. As a result, the fuel cell system 204, which was supported on the second surface 614 of the second base arrangement 610, is now supported on the rollers of the second rolling members. In an embodiment, when the fuel cell system 204 is supported on the rollers of the second rolling member, the fuel cell system 204 may lose contact with the second surface 614 of the second base arrangement 610, causing easy movement of the fuel cell system 204 without any friction between the surface of the fuel cell system and the second base surface of the first base arrangement 210. As the fuel cell system is supported on the rollers of the second rolling member, a small amount of the force is sufficient to move the fuel system from the second base arrangement to the first base arrangement. A service technician can push the fuel cell system towards the fuel cell enclosure to move the fuel cell system 204 from the cart assembly 600 to the fuel cell enclosure over the rollers of the first and second rolling members as the rollers of the first and second rolling members are in the inflated positions. While moving the fuel cell system, each of the rollers of the first and second rolling members rotates about the respective rotation axis and does not perform any translatory motion.

When the fuel cell system is completely moved to the first base arrangement, the fuel cell system now gets supported on the rollers of the first rolling members. In this case, the fuel cell system may not be in contact with the second surface of the first base arrangement. However, when the first rolling members are deflated, the fuel cell system comes into contact with the second surface of the first base arrangement as shown in FIG. 2B. Upon installation of the fuel cell system in the fuel cell enclosure, the cart assembly can be moved along a walkway through the guide rails.

FIG. 10 is a schematic representing the movement of the cart assembly on the track upon loading of the cart assembly, in accordance with an embodiment of the present invention. As illustrated in FIG. 10, the cart assembly can be moved on the walkway 1002 configured between the fuel cell enclosures 202 through the guide rails 1004. The guide rails 1004 may be configured on the walkway 1002 to allow movement of the cart assembly 600 on the walkway 1002. The walkway 1002 may be configured with gratings 1006 on the floor of a vessel in marine applications. Gratings 1006 are designed with patterns and textures that provide a high level of slip resistance.

FIG. 11 is a block diagram representing a fuel cell assembly 200 showing a high-density installation of fuel cell systems. The walkway 1002 having gratings between rows of fuel cell systems 204 may include a raised floor structure designed to minimize the risk of damage to equipment. Further, the fuel cell assembly may include one or more guide rails 1004 embedded into the walkway 1002 to provide a guided pathway. The guide rails 1004 form the track for the cart assembly to move the cart assembly along the track for safe transportation of fuel cell systems. The cart assembly 600 may be allowed to move along the one or more guide rails 1004 on the walkway 1002 to position itself at the fuel cell system removal or installation site in the fuel cell assembly 200. At the fuel cell system removal or installation site, the fuel cell system 204 rolls from or rolls into the fuel cell enclosure 202 on either side of the cart assembly 600 via one or more first and second rolling members operated through a pneumatic source.

Once the fuel cell system 204 is removed from the fuel cell enclosure 202 and secured to the cart assembly 600, the cart assembly 600 may transport the fuel cell system 204 safely along the one or more guide rails 1004 on the walkway 1002 to a gantry crane 1012 positioned at the end of the walkway 1002. The gantry crane 1012 may include a single-axis gantry crane configured to hoist the fuel cell system 204 loaded on the cart assembly 600 along with the cart assembly 600 to an overhead service hatch location 1014. The overhead service hatch location 1014 is a hatch opening area where the fuel cell system 204 would be removed from the fuel cell assembly, rolled onto an elevator (not shown in the figure), and sent for servicing or repair. In another embodiment, the fuel cell system can be lifted off the rails and moved to the deck floor level where it can be picked up and moved off of the marine vessel.

After the removal of the fuel cell system 204, a replacement fuel cell system 204' secured to the same cart assembly 600 or another cart assembly 600' is positioned at the end of the one or more guide rails 1004 and is ready for pickup by the gantry crane 1012. The gantry crane 1012 picks up the replacement fuel cell system 204' along with the cart assembly 600' and deposits it on the walkway 1002 leading to the fuel cell enclosure 202 where the replacement fuel cell system 204' needs to be installed. When the cart assembly is not used, such cart assembly e.g. 600" may be stowed away.

In an embodiment, when the cart assembly 600 is loaded with the fuel cell system and the cart assembly with the fuel cell system is rolled down the aisle to the end, it can be lifted off the raised tracks through a lifting frame or a chain lift mechanism and onto the main deck flooring. The lifting frame may include a frame structure mechanically coupled to the second base arrangement of the cart assembly. In particular, the four corners of the second base arrangement are coupled with the four members of the lifting frame. The other side of the four members of the lifting frame can be connected to a hook to lift the cart assembly loaded with the fuel cell system. The lifting frame can be detached with the cart assembly for easy transportation of the fuel cell system on the floor. Similarly, a chain lift can be used as an alternative to the lifting frame. In the chain lift, four chain linkages are connected to the four ends of the cart assembly, and the other end of the chain linkages are connected to a rectangular structure that can be connected to a hook to lift the cart assembly loaded with the fuel cell system.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed:

1. A fuel cell assembly comprising:
   a first base arrangement comprising a first surface and a second surface, the second surface comprising a plurality of holes;
   one or more first slots configured between the first surface and the second surface;
   a fuel cell system configured on the second surface of the first base arrangement;
   one or more first rolling members provided in the one or more first slots, wherein each of the first rolling members comprises a plurality of rollers,
   each of the one or more first rolling members is configured to be inflated and deflated, wherein the inflating and deflating of each first rolling member facilitates movement of the plurality of rollers of each first rolling member into the plurality of holes and out of the plurality of holes, respectively,
   wherein the movement of the plurality of rollers of each first rolling member into the plurality of holes and out of the plurality of holes enables the fuel cell system to move between a raised position and a lowered position, wherein the raised position of the fuel cell system indicates a position in which the fuel cell system is in contact with the plurality of rollers and the lowered position of the fuel cell system indicates a position in which the fuel cell system is out of contact with the plurality of rollers; and
   a cart assembly configured adjacent to the first base arrangement, the cart assembly comprising:
      a second base arrangement comprising a first surface and a second surface, the second surface comprising a plurality of holes;
      one or more second slots configured between the first surface and the second surface of the second base arrangement;
      one or more second rolling members provided in the one or more second slots, wherein each of the second rolling members comprises a plurality of rollers,
      wherein each of the one or more second rolling members is configured to be inflated and deflated, wherein the inflating and deflating of each second rolling member facilitates movement of the plurality of rollers of each second rolling member into the plurality of holes of the second base arrangement and out of the plurality of holes the second base arrangement, respectively,
      wherein the movement of the plurality of rollers of each first rolling member through the plurality of holes of the first base arrangement and the movement of the plurality of rollers of each second rolling member through the plurality of holes of the second base arrangement facilitate the fuel cell system to move between the first base arrangement and second base arrangement.

2. The fuel cell assembly as claimed in claim 1, further comprising a pneumatic source configured to inflate each of the one or more first rolling members.

3. The fuel cell assembly as claimed in claim 1, wherein the one or more first rolling members are configured to be inflated or deflated in a lateral direction.

4. The fuel cell assembly as claimed in claim 1, wherein each of the plurality of rollers of each of the first rolling members is configured to rotate about a respective rotation axis when the fuel cell system moves over the corresponding plurality of rollers.

5. The fuel cell assembly as claimed in claim 1, wherein the cart assembly comprises
   a set of wheels configured with the second base arrangement.

6. The fuel cell assembly as claimed in claim 5, wherein the set of wheels is configured to move on a walkway embedded with gratings.

7. The fuel cell assembly as claimed in claim 1, wherein the cart assembly further comprises a lifting arrangement configured to move the second base arrangement in a vertical direction to align the second base arrangement to the first base arrangement at a same height level.

8. The fuel cell assembly as claimed in claim 7, wherein the lifting arrangement comprises a set of hydraulic cylinders coupled with a pump to move the second base arrangement in a vertical direction upwardly or downwardly.

9. The fuel cell assembly as claimed in claim 7, wherein the lifting arrangement comprises levelling feet with threaded shafts to be screwed up and down to move the second base arrangement in a vertical direction upwardly or downwardly.

10. The fuel cell assembly as claimed in claim 1, wherein, upon movement of the fuel cell system from the first base arrangement to the second base arrangement, the first and second rolling members are deflated.

* * * * *